United States Patent
Tsujii et al.

(10) Patent No.: US 12,304,557 B2
(45) Date of Patent: May 20, 2025

(54) STEERING COMPUTING DEVICE

(71) Applicant: JTEKT CORPORATION, Kariya (JP)

(72) Inventors: Shunsuke Tsujii, Okazaki (JP); Yufeng Lin, Iwata (JP); Hidenori Itamoto, Tajimi (JP); Terutaka Tamaizumi, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 161 days.

(21) Appl. No.: 18/358,076

(22) Filed: Jul. 25, 2023

(65) Prior Publication Data

US 2024/0034406 A1     Feb. 1, 2024

(30) Foreign Application Priority Data

Jul. 26, 2022    (JP) ................. 2022-118732

(51) Int. Cl.
     *B62D 5/04*      (2006.01)
     *B62D 15/02*      (2006.01)

(52) U.S. Cl.
     CPC ......... *B62D 15/024* (2013.01); *B62D 5/0457* (2013.01); *B62D 15/0225* (2013.01); *B62D 15/0235* (2013.01)

(58) Field of Classification Search
     CPC .... B62D 5/0457; B62D 5/046; B62D 5/0463; B62D 15/0225; B62D 15/0235; B62D 15/024
     USPC ........................................................ 701/41
     See application file for complete search history.

(56) References Cited

U.S. PATENT DOCUMENTS

| | | |
|---|---|---|
| 2007/0107977 A1 | 5/2007 | Shibata |
| 2008/0027609 A1 | 1/2008 | Aoki et al. |
| 2017/0144692 A1 | 5/2017 | Russell et al. |
| 2020/0290671 A1 | 9/2020 | Farshizadeh et al. |

(Continued)

FOREIGN PATENT DOCUMENTS

| | | |
|---|---|---|
| JP | 2003-205846 A | 7/2003 |
| JP | 2008-049992 A | 3/2008 |
| JP | 2008-174047 A | 7/2008 |

OTHER PUBLICATIONS

U.S. Appl. No. 18/358,079, filed Jul. 25, 2023 in the name of Shunsuke Tsujii et al.

(Continued)

*Primary Examiner* — Erick R Solis
(74) *Attorney, Agent, or Firm* — Oliff PLC

(57) ABSTRACT

A steering computing device for calculating state quantity of a steering apparatus includes a processor. The processor is configured to execute a steering angle variable acquisition process, an output shaft angle variable acquisition process, and a joint angle variable calculation process. The steering angle variable acquisition process is a process of acquiring a value of a steering angle variable. The output shaft angle variable acquisition process is a process of acquiring a value of an output shaft angle variable as a variable indicative of a rotation angle of an output shaft of the steering apparatus. The joint angle variable calculation process is a process of calculating a value of the joint angle variable. The joint angle variable is a variable defining an angle formed between an axial direction of an input shaft of the steering apparatus and an axial direction of the output shaft.

7 Claims, 5 Drawing Sheets

(56) References Cited

U.S. PATENT DOCUMENTS

2022/0212715 A1* 7/2022 Kurokawa ............. B62D 1/187
2023/0174148 A1* 6/2023 Ekström ................ B62D 5/006
                                                    701/41

OTHER PUBLICATIONS

U.S. Appl. No. 18/358,072, filed Jul. 25, 2023 in the name of Shunsuke Tsujii et al.
Dec. 13, 2023 Extended European Search Report issued in European Patent Application No. 23187633.5.
Dec. 5, 2023 Extended Search Report issued in European Patent Application No. 23187628.5.

\* cited by examiner

STEERING COMPUTING DEVICE

CROSS-REFERENCE TO RELATED APPLICATION

This application claims priority to Japanese Patent Application No. 2022-118732 filed on Jul. 26, 2022, incorporated herein by reference in its entirety.

BACKGROUND

1. Technical Field

The disclosure relates to a steering computing device.

2. Description of Related Art

For example, Japanese Unexamined Patent Application Publication No. 2008-49992 (JP 2008-49992 A) describes a device configured to transmit the rotational power of a steering wheel to steered wheels via three shafts. Here, the three shafts are connected to each other via two Cardan joints. This device estimates bending angles of the Cardan joints based on a detection value from a tilt angle sensor.

SUMMARY

The above estimation method of estimating a bending angle cannot estimate a bending angle in a case where no tilt angle sensor is provided.

The following describes the means that can solve the problem and effects thereof.

1. One aspect of the present disclosure relates to a steering computing device for calculating state quantity of a steering device. The steering apparatus includes a steering wheel, an input shaft, an intermediate shaft, an output shaft, a first Cardan joint, a second Cardan joint, and steered wheels. The input shaft is connected to the steering wheel, the first Cardan joint is a member connecting the input shaft to the intermediate shaft, the second Cardan joint is a member connecting the intermediate shaft to the output shaft, and the steered wheels are configured to receive a steering torque input into the steering wheel, via the input shaft, the intermediate shaft, and the output shaft. The steering computing device includes a processor. The processor is configured to execute a steering angle variable acquisition process, an output shaft angle variable acquisition process, and a joint angle variable calculation process. The steering angle variable acquisition process is a process of acquiring a value of a steering angle variable as a variable indicative of a rotation angle of the steering wheel. The output shaft angle variable acquisition process is a process of acquiring a value of an output shaft angle variable as a variable indicative of a rotation angle of the output shaft. The joint angle variable calculation process is a process of calculating a value of a joint angle variable with the use of the value of the steering angle variable and the value of the output shaft angle variable as inputs. The joint angle variable is a variable defining an angle formed between an axial direction of the input shaft and an axial direction of the output shaft.

Since the relationship of the rotation angle of the output shaft with the steering angle depends on the bending angle between the input shaft and the intermediate shaft and the bending angle between the intermediate shaft and the output shaft, the paired bending angles can be grasped from the rotation angle of the output shaft and the steering angle. In the above configuration, in consideration of this, the value of the joint angle variable can be calculated with the use of the value of the steering angle variable and the value of the output shaft angle variable as inputs. Accordingly, the value of the joint angle variable can be calculated without the necessity of a sensor configured to detect a tilt angle.

2. In the steering computing device according to the above aspect, the joint angle variable may include a first bending angle defining an angle formed between the input shaft and the intermediate shaft, and a second bending angle defining an angle formed between the output shaft and the intermediate shaft.

With the above configuration, in comparison with a case where the first bending angle and the second bending angle are quantified as values of single variables, it is possible to acquire more detailed information about the first bending angle and the second bending angle.

3. In the steering computing device according to the above aspect, the joint angle variable may further include a difference angle variable in addition to the first bending angle and the second bending angle. The difference angle variable may be a variable depending on an angle formed between a first plane and a second plane. The first plane may be a plane parallel to the axial direction of the input shaft and an axial direction of the intermediate shaft. The second plane may be a plane parallel to the axial direction of the output shaft and the axial direction of the intermediate shaft.

The relationship between the rotation angle of the output shaft and the steering angle also depends on the angle formed as abovementioned in addition to the bending angle between the input shaft and the intermediate shaft and the bending angle between the intermediate shaft and the output shaft. This means that the angle formed as abovementioned can be grasped from the rotation angle of the output shaft and the steering angle. Accordingly, with the above configuration, the value of the difference angle variable can be calculated.

4. In the steering computing device according to the above aspect, the steering angle variable acquisition process may include a process of acquiring different values for the steering angle variable. The output shaft angle variable acquisition process may include a process of acquiring values for the output shaft angle variable, the values being synchronized with the different values for the steering angle variable, respectively. The joint angle variable calculation process may be a process of calculating the value of the joint angle variable with the use of, as inputs, the different values for the steering angle variable and the values for the output shaft angle variable, the values being synchronized with the different values, respectively.

In the above configuration, the relationship between the rotation angle of the output shaft and the steering angle changes depending on the value of the joint angle variable. The rotation angle of the output shaft at the time when the steering angle takes various values includes detailed information about the relationship between the rotation angle of the output shaft and the steering angle. Accordingly, with the above configuration, by calculating the value of the joint angle variable with the use of a plurality of values of the steering angle variable, the value of the joint angle variable can be calculated based on the detailed information about the relationship.

5. In the steering computing device according to the above aspect, the different values targeted to be acquired in the steering angle variable acquisition process may include values having absolute values for the steering angle variable such that a difference between a minimum value among the absolute values and a maximum value among the absolute values is equal to or more than a predetermined value.

In a case where the difference between the maximum value and the minimum value among the absolute values of the steering angle is large, it is possible to obtain more useful information to specify the value of the joint angle variable in terms of the relationship between the rotation angle of the output shaft and the steering angle, in comparison with a case where the difference is small. Accordingly, with the above configuration, it is possible to enhance the accuracy to calculate the value of the joint angle variable by setting the predetermined value.

6. The steering computing device according to the above aspect may further include a storage device in which relationship definition data is stored. The relationship definition data may be data defining a relational expression. The relational expression may be an expression defining a relationship between the value of the steering angle variable, the value of the output shaft angle variable, and the value of the joint angle variable. The joint angle variable calculation process may include a process of calculating the value of the joint angle variable by the method of least squares by inputting, into the relational expression, the different values for the steering angle variable and the values for the output shaft angle variable, the values being synchronized with the different values, respectively.

A physical relational expression is established between the steering angle, the rotation angle of the output shaft, and the value of the joint angle variable. Accordingly, in the above configuration, the value of the joint angle variable can be calculated by the method of least squares with the value of the joint angle variable in the relational expression being taken as an unknown.

7. In the steering computing device according to the above aspect, the steering apparatus may include an actuator configured to generate power turning the steered wheels. The steering computing device may be configured to execute an operation process and a reflection process. The operation process may be a process of operating the actuator in response to operation of the steering wheel. The reflection process may be a process of reflecting the value of the joint angle variable on the operation of the actuator.

The relationship between the steering angle and the rotation angle of the output shaft and the relationship between the steering torque and a torque applied to the output shaft change depending on the value of the joint angle variable. Accordingly, in a case where the actuator is operated in response to the operation of the steering wheel without considering the value of the joint angle variable, there is a concern that the operation of the actuator does not become appropriate operation, depending on the value of the joint angle variable. In view of this, with the above configuration, by reflecting the value of the joint angle variable on the operation process, it is possible to make the operation process more appropriate.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
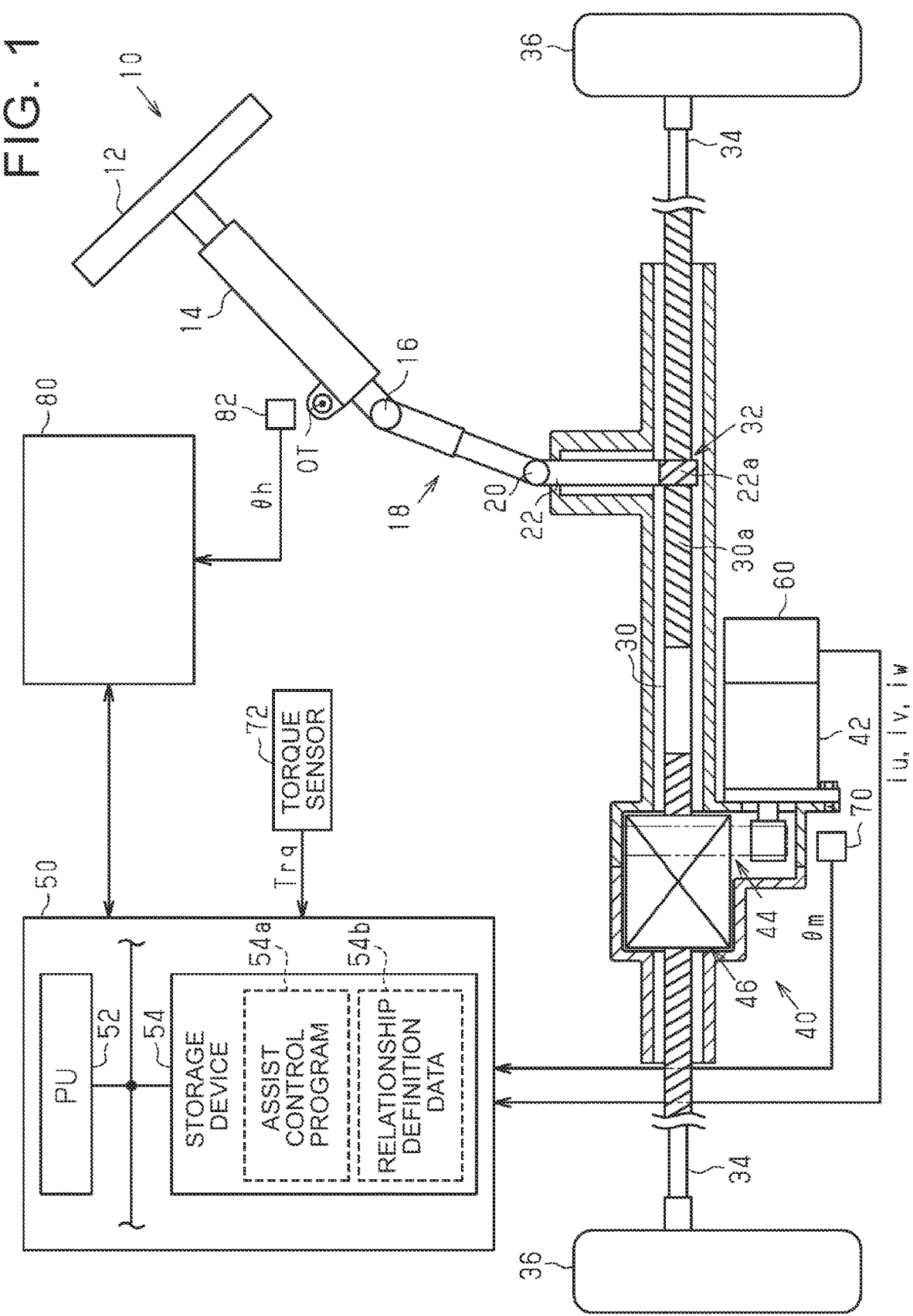
FIG. 1 is a view illustrating the configuration of a steering control system according to one embodiment.

The following describes one embodiment of a steering computing device with reference to the drawings.
System Configuration As illustrated in FIG. 1, a steering apparatus 10 is an apparatus configured to turn steered wheels 36 by collaboration with a steering torque input into a steering wheel 12 by a driver and power of a turning actuator 40. The steering apparatus 10 is an electric power steering apparatus. In the following description, a case where the steering wheel 12 is operated in the right direction or the left direction is referred to as "steering."

The steering wheel 12 is fixed to a column shaft 14. The column shaft 14 is mechanically connected to an intermediate shaft 18 via a first Cardan joint 16. The intermediate shaft 18 has a well-known contractible configuration. Out of two end parts of the intermediate shaft 18 in its axial direction, an end part on a side reverse to an end part connected to the first Cardan joint 16 is connected to a pinion shaft 22 via a second Cardan joint 20.

Figure 2:
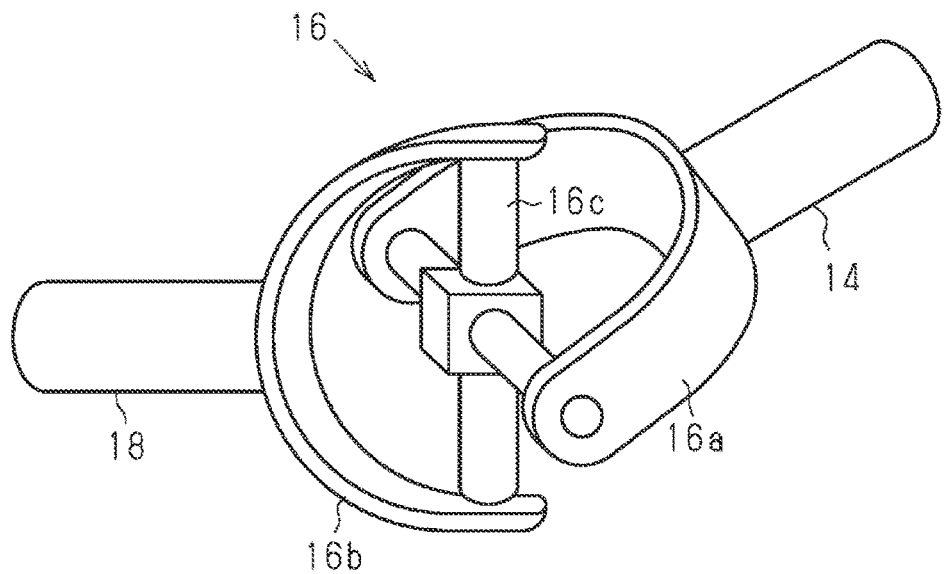
FIG. 2 is a view illustrating the configuration of a first Cardan joint according to the embodiment.

FIG. 2 illustrates the configuration of the first Cardan joint 16. The first Cardan joint 16 includes a first yoke 16a, a second yoke 16b, and a joint cross 16c. The joint cross 16c has a cross shape. The joint cross 16c connects the first yoke 16a and the second yoke 16b to each other such that the first yoke 16a and the second yoke 16b are rotatable. The first yoke 16a is fastened with an end part of the column shaft 14 by a bolt (not illustrated). Note that the first yoke 16a may be welded to the end part of the column shaft 14. The second yoke 16b is fixed to an end part of the intermediate shaft 18 by welding.

Note that the configuration of the second Cardan joint 20 is similar to the configuration of the first Cardan joint 16, and therefore, the configuration of the second Cardan joint 20 is not described herein. Referring back to FIG. 1, the pinion shaft 22 is placed to have a predetermined crossing angle from a rack shaft 30. A rack-and-pinion mechanism 32 is configured such that rack teeth 30a formed on the rack shaft 30 are engaged with pinion teeth 22a formed on the pinion shaft 22. Further, respective tie rods 34 are connected to the opposite ends of the rack shaft 30. Respective distal ends of the tie rods 34 are connected to respective knuckles (not illustrated) to which the steered wheels 36 are assembled, respectively. By the rack-and-pinion mechanism 32, the rotation operation of the steering wheel 12 is converted into the displacement operation of the rack shaft 30 in the axial direction. When the displacement operation in the axial direction is transmitted to the knuckles via the tie rods 34, the turning angles of the steered wheels 36 are changed. Note that a turning angle is a steered angle of a tire as the steered wheel 36.

The turning actuator 40 includes an assist motor 42 as a drive source, a transmission mechanism 44 configured to transmit the torque of the assist motor 42, and a ball screw mechanism 46. The ball screw mechanism 46 converts the torque of the assist motor 42, transmitted via the transmission mechanism 44, into force to displace the rack shaft 30 in the axial direction. The assist motor 42 is a three-phase brushless motor as an example. An output voltage of the inverter 60 is applied to a terminal of the assist motor 42.

The control device 50 operates the inverter 60 to control the amount of control to the steered wheels 36 as controlled objects. The control device 50 refers to a rotation angle θm of the assist motor 42, detected by a rotation angle sensor 70, so as to control the amount of control. Further, the control device 50 refers to currents iu, iv, iw output from the inverter 60. Note that the currents iu, iv, iw may be grasped as voltage drop amounts of respective shunt resistors provided in legs of the inverter 60. Further, the control device 50 refers to a torque Trq applied to the steering wheel 12, detected by a torque sensor 72.

The control device 50 includes a PU 52 and a storage device 54. The PU 52 is a software processing device including at least one of a CPU, a GPU, a TPU, and so on. An upper ECU 80 is an electronic control unit configured to generate a command upper than the control device 50 about the control of a vehicle. The upper ECU 80 refers to a steering angle θh detected by a steering angle sensor 82. The steering angle θh is a rotation angle of the steering wheel 12. In other words, the steering angle θh is a rotation angle of the column shaft 14.

The control device 50 and the upper ECU 80 are communicable with each other. The control device 50 can receive the steering angle θh acquired by the upper ECU 80. However, the sampling period of the steering angle θh is longer than the sampling period of the rotation angle θm.

Assist Control

Figure 3:
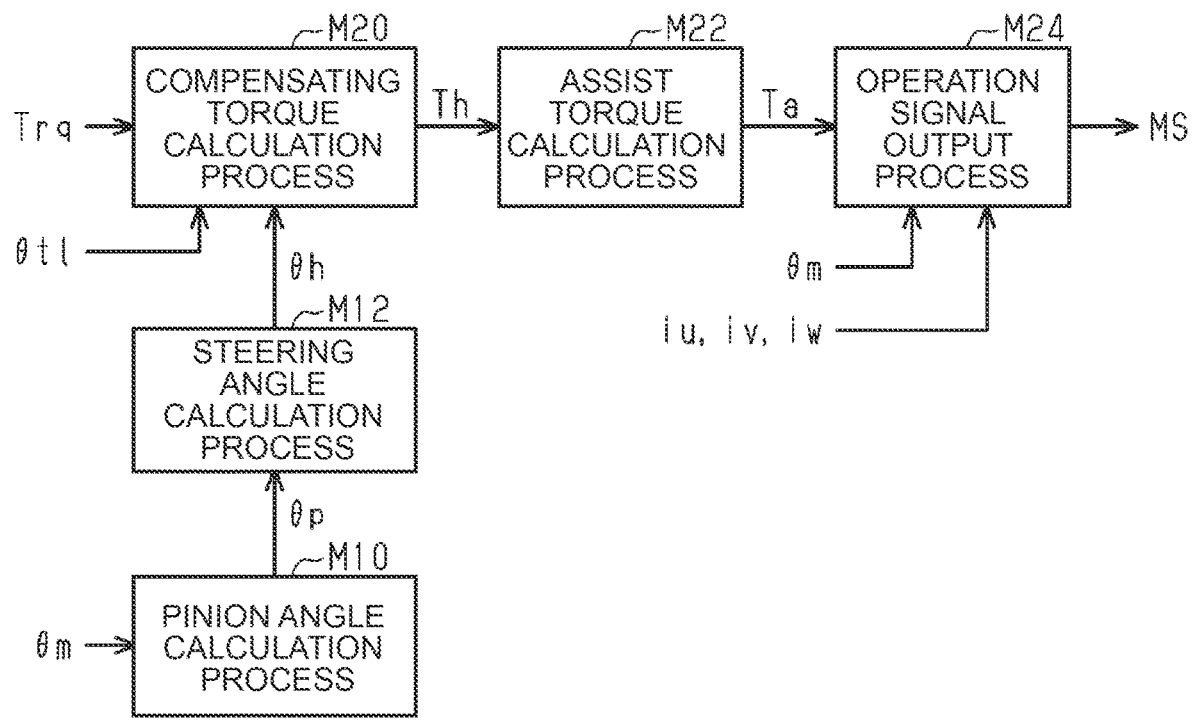
FIG. 3 is a block diagram illustrating processes executed by a control device according to the embodiment.

FIG. 3 illustrates processes to be executed by the control device 50. The processes illustrated in FIG. 3 are implemented by the PU 52 executing an assist control program 54*a* stored in the storage device 54 repeatedly at a predetermined cycle, for example.

A pinion angle calculation process M10 is a process of calculating a pinion angle θp that is a rotation angle of the pinion shaft 22 with the use of the rotation angle θm as an input. A steering angle calculation process M12 is a process of calculating the steering angle θh as with the use of the pinion angle θp as an input. The steering angle calculation process M12 is a process of calculating the steering angle θh by use of relationship definition data 54*b* stored in the storage device 54 illustrated in FIG. 1. The relationship definition data 54*b* includes data defining a relational expression defined by Equation (c1). The relational expression takes the pinion angle θp as an independent variable and the steering angle θh as a dependent variable.

$$\theta h = -\arctan\frac{\tan\left[-\arctan\left\{\frac{\tan(\theta p + \arctan(\tan\phi \cdot \cos\alpha 2))}{\cos\alpha 2}\right\} + \phi\right]}{\cos\alpha 1} \quad (c1)$$

Here, a bending angle α1 of the first Cardan joint 16, a bending angle α2 of the second Cardan joint 20, and a difference angle variable ψ are used. The bending angle α1 of the first Cardan joint 16 is an angle formed between the axial direction of the column shaft 14 and the axial direction of the intermediate shaft 18. Further, the bending angle α2 of the second Cardan joint 20 is an angle formed between the axial direction of the intermediate shaft 18 and the axial direction of the pinion shaft 22. The difference angle variable ψ is "90–ξ+ε." Here, "ξ" is an angle formed between a first plane parallel to both the axial direction of the column shaft 14 and the axial direction of the intermediate shaft 18 and a second plane parallel to both the axial direction of the intermediate shaft 18 and the axial direction of the pinion shaft 22. Further, "ε" is a phase difference between the second yoke 16*b* as a yoke on the intermediate shaft 18 side out of two yokes of the first Cardan joint 16 and a yoke on the intermediate shaft 18 side out of two yokes of the second Cardan joint 20. The phase difference used herein indicates a deviation between rotation angles around the axial direction of the intermediate shaft 18.

Equation (c1) is derived by applying an equation defining the relationship between a bending angle and a rotation angle of paired yokes in a Cardan joint to the first Cardan joint 16 and the second Cardan joint 20.

That is, Equation (c1) is derived by use of simultaneous equations of Equations (c2) and (c3) as follows.

$$\tan\theta 2 = \cos\alpha 1 \cdot \tan\theta h \quad (c2)$$

$$\tan(\theta p') = \cos\alpha 2 \cdot \tan(\theta 2 + \xi) \quad (c3)$$

Note that "θ2" is the rotation angle of the intermediate shaft 18. Further, "θp'" indicates a phase difference of the pinion angle θp from "θh." More specifically, Equation (c4) is found from Equation (c2) and Equation (c3).

$$\theta p' = \arctan(\tan[\arctan\{\tan(\theta h)\cdot\cos(\alpha 1)\} + \xi]\cdot\cos(\alpha 2)) \quad (c4)$$

Accordingly, the pinion angle θp is expressed by Equation (c5) as follows.

$$\theta p = \theta p' - \arctan\{\tan(\xi)\cdot\cos(\alpha 2)\} \quad (c5)$$

By removing θp' from Equation (c4) and Equation (c5), Equation (c1) is derived.

A compensating torque calculation process M20 is a process of calculating a steering torque Th by removing gravitational influence from a torque Trq. That is, the rotation center of the steering wheel 12 deviates from the gravitational center of the steering wheel 12. Accordingly, the torque Trq detected by the torque sensor 72 is a resultant force of a torque input in the steering wheel 12 by a driver and gravity. The compensating torque calculation process M20 is a process of calculating the steering torque Th by removing a gravitational component included in the torque Trq.

Here, the magnitude of the gravity that contributes to the torque Trq changes periodically depending on the steering angle θh. Accordingly, the compensating torque calculation process M20 is a process of calculating the steering torque Th with the use of the steering angle θh as an input.

In the meantime, the column shaft 14 can rotate around a rotation center OT illustrated in FIG. 1. Hereby, the position of the steering wheel 12 is adjustable. Note that, in a case where a tilt angle θtl as a rotational amount around the rotation center OT changes, even when the steering angle θh is the same, the magnitude of the gravity that contributes to the torque Trq changes. Accordingly, the compensating torque calculation process M20 is a process of calculating the steering torque Th with the use of the tilt angle θtl as an input.

An assist torque calculation process M22 is a process of calculating an assist torque Ta with the use of the steering torque Th as an input. That is, the assist torque calculation process M22 is a process of changing the magnitude of the assist torque Ta in accordance with the magnitude of the steering torque Th so as to achieve a suitable magnitude of the assist torque Ta for the steering intended by the driver.

The assist torque calculation process M22 may be a process of causing the magnitude of the assist torque Ta at the time of the magnitude of the steering torque Th being large to be equal to or more than the magnitude of the assist torque Ta at the time of the magnitude of the steering torque Th being small. Further, the assist torque calculation process M22 may be a process of setting the assist torque Ta to different values for turning and for turning back even when the magnitude of the steering torque Th is the same.

An operation signal output process M24 is a process of generating and outputting an operation signal MS of the inverter 60 to control the torque of the assist motor 42 to the assist torque Ta, with the use of the assist torque Ta, the rotation angle θm, and the currents iu, iv, iw as inputs. Note that the operation signal MS is an operation signal to each switching element of the inverter 60 in practice.

Estimation of Tilt Angle

As described above, the tilt angle θtl changes. In a case where the tilt angle θtl changes, the first bending angle α1, the second bending angle α2, and the difference angle variable ψ also change. Accordingly, in the present embodiment, the first bending angle α1, the second bending angle α2, the difference angle variable ψ, and the tilt angle θtl are not values determined univocally by specifications but are variables that change when the driver changes the tilt angle θtl.

Figure 4:
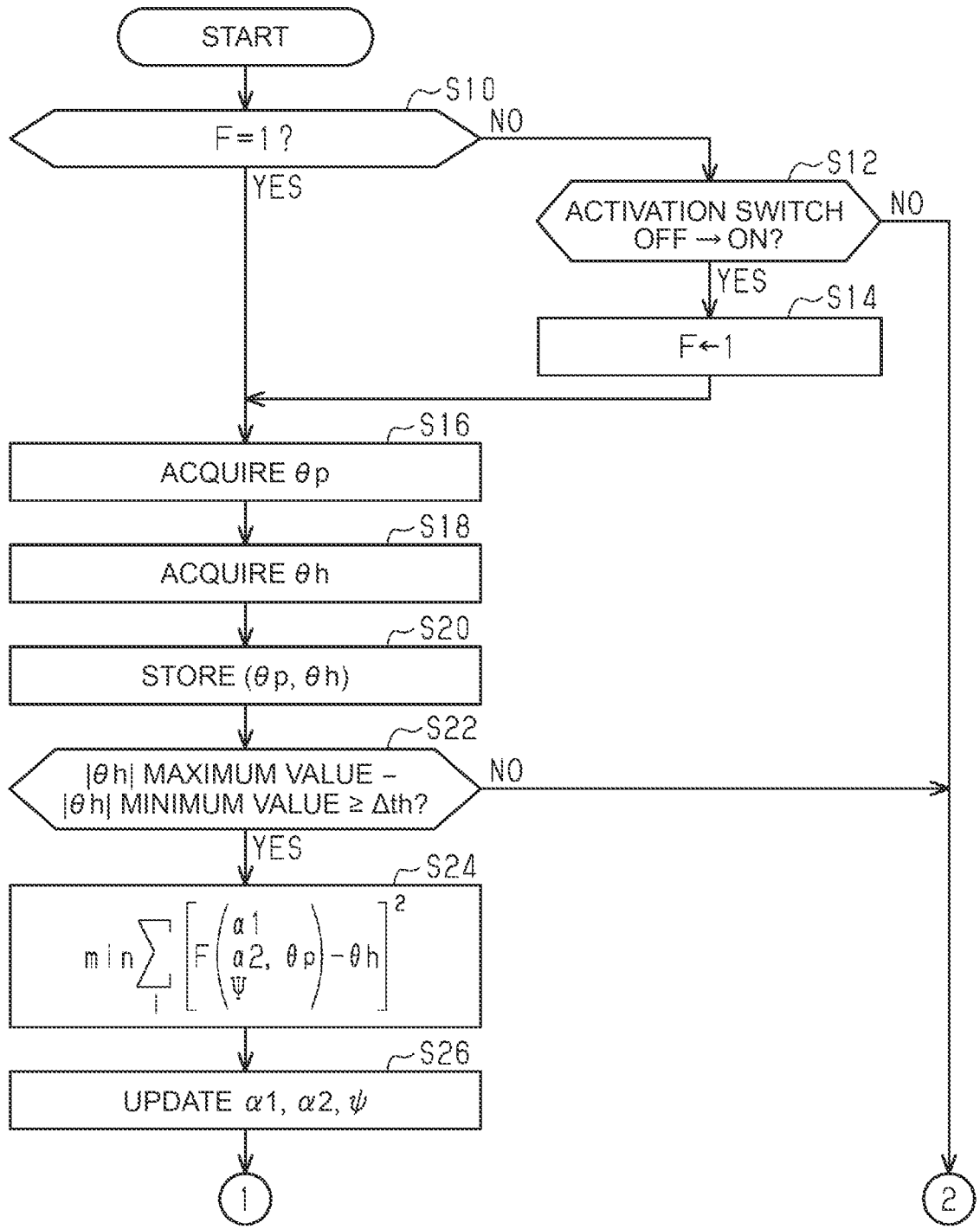
FIG. 4 is a flowchart illustrating the procedure of a process executed by the control device according to the embodiment.
Figure 5:
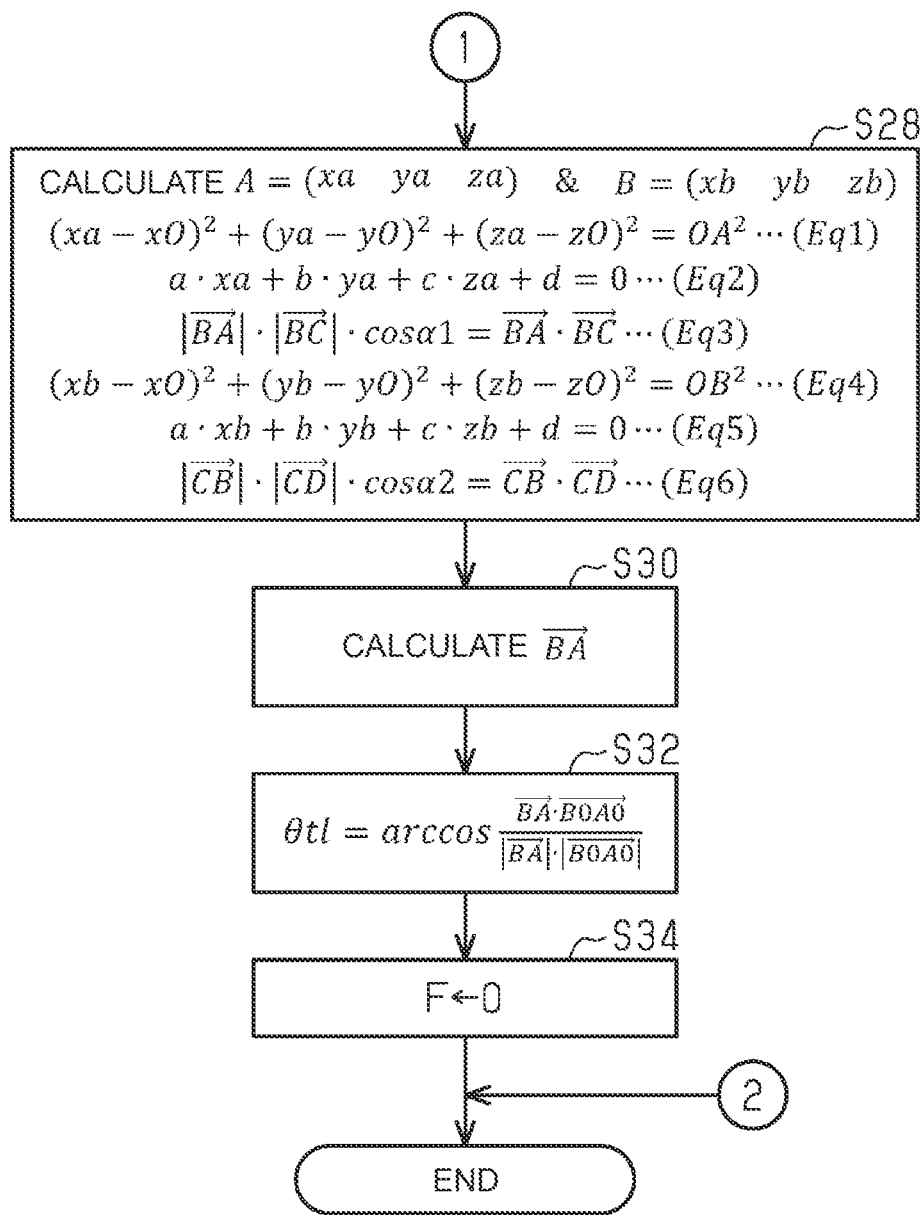
FIG. 5 is a flowchart illustrating the procedure of a process executed by the control device according to the embodiment.

The following describes details of an estimation process of estimating these variables. FIGS. 4, 5 illustrate the procedure of the estimation process. The processes illustrated in FIGS. 4, 5 are implemented by the PU 52 executing the assist control program 54a stored in the storage device 54 repeatedly at a predetermined cycle, for example.

In a series of processes illustrated in FIG. 4, the PU 52 first determines whether or not an update flag F is "1" (S10). In a case where the update flag F is "1," the update flag indicates execution of a process of updating the variables. In a case where the update flag F is "0," the update flag indicates non-execution of the process of updating the variables.

In a case where the PU 52 determines that the update flag F is "0" (S10: NO), the PU 52 determines whether or not an activation switch is just switched from an OFF state to an ON state (S12). The activation switch is a switch for bringing the vehicle to a runnable state. For example, in a case where only an internal combustion engine is provided as a thrust generation device in the vehicle, the activation switch may be an ignition switch. Further, in a case where the thrust generation device in the vehicle includes a motor, the activation switch may be a switch configured to open and close an electrical path between the motor and a battery.

In a case where the PU 52 determines that the activation switch is switched to the ON state (S12: YES), the PU 52 substitutes "1" into the update flag F (S14). In a case where the PU 52 makes an affirmative determination in the process of S10, or in a case where the PU 52 ends the process of S14, the PU 52 acquires a pinion angle θp (S16). Further, the PU 52 acquires a steering angle θh by communication with the upper ECU 80 (S18). Then, the PU 52 stores a set of the pinion angle θp and the steering angle θh in the storage device 54 (S20). The pinion angle θp and the steering angle θh are synchronous data. This can be achieved by setting a period of the series of processes illustrated in FIG. 5 to a reception interval of the steering angle θh, for example.

Subsequently, the PU 52 determines whether or not the difference between a maximum value and a minimum value among absolute values of the steering angle θh, stored by the process of S20, is equal to or more than a predetermined value Δth (S22). When the PU 52 determines that the difference is a predetermined value Δth or more (S22: YES), the PU 52 finds a first bending angle α1, a second bending angle α2, and a difference angle variable ψ by the method of least squares (S24).

That is, for each set of the pinion angle θp and the steering angle θh stored in the process of S20, the PU 52 calculates the square of the difference between a value obtained by substituting the pinion angle θp into the right side of Equation (c1) and the steering angle θh. Then, the PU 52 searches for the first bending angle α1, the second bending angle α2, and the difference angle variable ψ that minimize the sum total of respective squares of the differences of the sets of the pinion angle θp and the steering angle θh stored in the process of S20.

Subsequently, the PU 52 updates the first bending angle α1, the second bending angle α2, and the difference angle variable ψ defined in the relationship definition data 54b (S26). Subsequently, the PU 52 calculates respective coordinates of a point A and a point B illustrated in FIG. 6 (S28 in FIG. 5).

Figure 6:
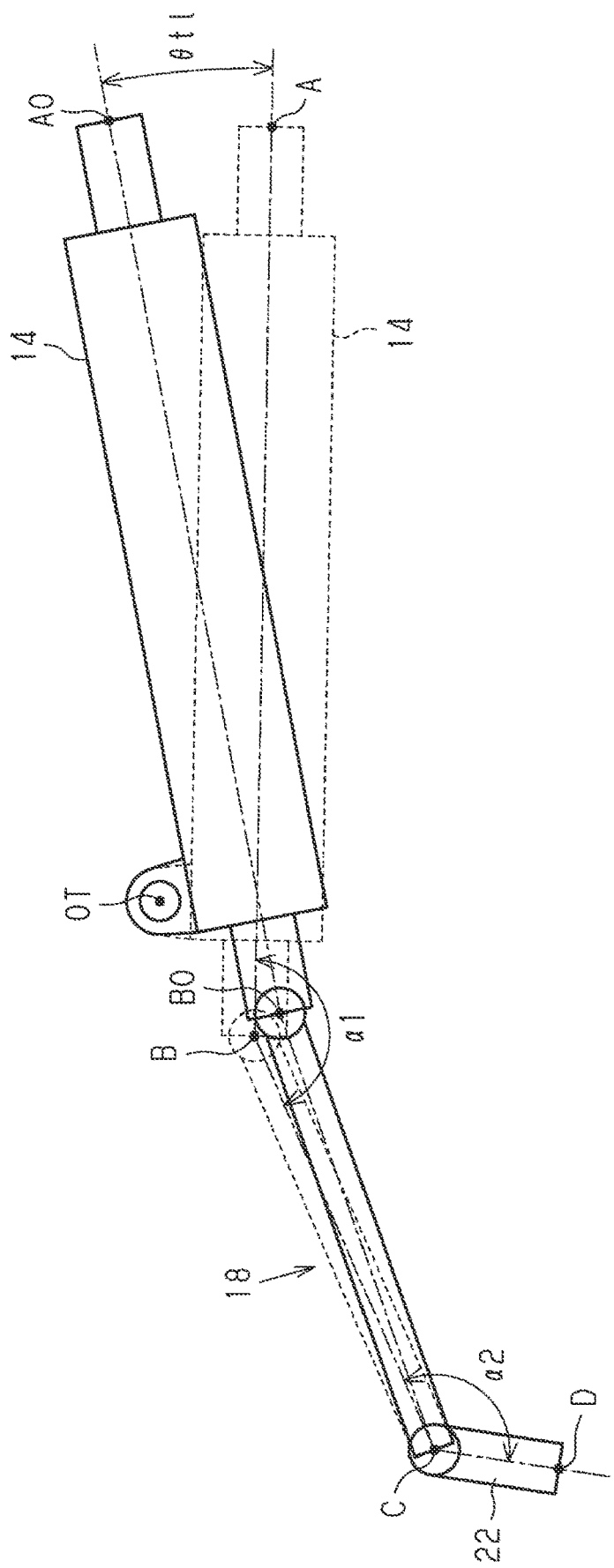
FIG. 6 is a view defining coordinates to be used for a calculation process of calculating a tilt angle according to the embodiment.

In FIG. 6, an axial center on an end part side connected to the steering wheel 12 out of end parts of the column shaft 14 is taken as the point A. Further, the point B is the center of the joint cross 16c of the first Cardan joint 16. A point C is the center of a joint cross of the second Cardan joint 20. Further, a point D is one point on the rotational central axis of the pinion shaft 22. The point D is introduced to define a vector parallel to the pinion shaft 22 together with the point C.

As described above, since the intermediate shaft 18 expands and contracts, when the tilt angle θtl changes, the distance between the point B and the point C changes. In the meantime, since the point B rotates around the rotation center OT, the distance between the rotation center OT and the point B does not change depending on the change in the tilt angle θtl. Similarly, the distance between the rotation center OT and the point A also does not change. In consideration of them, coordinates (xa, ya, za) of the point A and coordinates (xb, yb, zb) of the point B that are six unknowns are calculated by use of six simultaneous equations Eq1 to Eq6.

Here, Equation Eq1 is an equation about the square of the length between the rotation center OT and the point A. The square of the length is a predetermined fixed value. Further, coordinates (xO, yO, zO) of the rotation center OT are also fixed values.

Equation Eq2 is an equation obtained by substituting coordinate components of the point A into an equation expressing a plane on which the point A and the point B are present. The plane does not change depending on the change in the tilt angle θtl. Equation Eq3 is an equation expressing the inner product of a vector advancing from the point B to the point A and a vector advancing from the point B to the point C by use of the first bending angle α1.

Equation Eq4 is an equation about the square of the length between the rotation center OT and the point B. The square of the length is a predetermined fixed value. Equation Eq5 is an equation obtained by substituting coordinate components of the point B into the equation expressing the plane on which the point A and the point B are present.

Equation Eq6 is an equation expressing the inner product of a vector advancing from the point C to the point B and a vector advancing from the point C to the point D by use of the second bending angle α2. Subsequently, the PU 52 calculates the vector advancing from the point B to the point A, by use of the coordinate components found by the process of S28 (S30).

Then, the PU 52 calculates the tilt angle θtl (S32). The tilt angle θtl is quantified as an angle formed by a direction advancing from the point B to the point A relative to a direction advancing from a reference point B0 to a reference point A0, as an example. The reference point B0 is a reference point for the point B. The reference point A0 is a reference point for the point A. In a case where the steering wheel 12 is at a reference position, the point A is placed at the reference point A0. Further, in a case where the steering wheel 12 is at the reference position, the point B is placed at the reference point B0.

The PU 52 calculates the tilt angle θtl based on the inner product of a vector advancing from the reference point B0 to the reference point A0 and the vector advancing from the point B to the point A, the distance between the reference point B0 and the reference point A0, and the distance between the point B and the point A.

Then, the PU 52 substitutes "0" into the update flag F (S34). Note that, in a case where the PU 52 ends the process of S34, or in a case where the PU 52 makes a negative determination in the process of S12 or S22, the PU 52 ends the series of processes illustrated in FIGS. 4, 5 once.

Operations and Effects of Present Embodiment

The PU 52 estimates the first bending angle α1, the second bending angle α2, and the difference angle variable ψ based on Relational Expression (c1) by use of sequential data of the steering angle θh and the pinion angle θp. Then, the PU 52 calculates coordinate components of the point A and the point B by use of the first bending angle α1, the second bending angle α2, and the difference angle variable ψ. Then, the PU 52 calculates the tilt angle θtl based on the coordinate components of the point A and the point B. With the use of the tilt angle θtl, the PU 52 can remove the influence of the gravitational component on the torque Trq with accuracy and grasp the steering torque Th.

Correspondence

The correspondence between what is described in the above embodiment and what is described in the field of "SUMMARY" is as follows. In the following description, the correspondence is described for each number of the means for solving the problem described in the field of SUMMARY.

[1-4] The steering computing device corresponds to the control device 50. The input shaft corresponds to the column shaft 14. The output shaft corresponds to the pinion shaft 22. The steering angle variable acquisition process corresponds to the process of S18 that is repeated periodically until an affirmative determination is made in the process of S22. The output shaft angle variable acquisition process corresponds to the process of S16 that is repeated periodically until an affirmative determination is made in the process of S22. The joint angle variable calculation process corresponds to the processes of S20 to S24.

[5] This aspect corresponds to the process of S22.

[6] The relational expression corresponds to Equation (c1).

[7] The operation process corresponds to the operation signal output process M24. The reflection process corresponds to the compensating torque calculation process M20. That is, the compensating torque calculation process M20 takes the tilt angle θtl as an input. The tilt angle θtl depends on the first bending angle α1 and the second bending angle α2. Accordingly, the tilt angle θtl can change when the first bending angle α1 and the second bending angle α2 change. When the tilt angle θtl changes, the steering torque Th changes even when the torque Trq is the same. Hereby, the operation signal MS changes. That is, the changes in the first bending angle α1 and the second bending angle α2 are reflected on the operation signal MS.

Other Embodiments

Note that the present embodiment can also be carried out by adding changes as stated below. The present embodiment and the following modifications can be carried out in combination as long as they do not cause any technical inconsistencies.

Output Shaft Angle Variable Acquisition Process

The output shaft angle variable acquisition process is not limited to a process of acquiring a value calculated with the use of the rotation angle θm of the assist motor 42 as an input. For example, a sensor configured to detect the rotation angle of the pinion shaft 22 may be provided, so that the output shaft angle variable acquisition process may be a process of acquiring a detection value from the sensor. Further, for example, a sensor configured to detect the displacement amount of the rack shaft 30 in the axial direction may be provided, so that the output shaft angle variable acquisition process may be a process of acquiring a value calculated with the use of a detection value from the sensor as an input.

Relational Expression

The relational expression is not limited to an expression taking the pinion angle θp as an independent variable and the steering angle θh as an output variable. For example, the relational expression may be an expression with the use of the steering angle θh as an independent variable and the pinion angle θp as an output variable. It is not necessary for the relational expression to be in the form of a function expression. For example, the relational expression may be an expression in which a value obtained by computation using the pinion angle θp and the steering angle θh becomes a constant such as "0."

Joint Angle Variable Calculation Process

The joint angle variable calculation process is not limited to a process by the method of least squares using the relational expression. For example, the joint angle variable calculation process may be a regression model with the steering angle θh and the pinion angle θp being taken as inputs and the first bending angle α1, the second bending angle α2, and the difference angle variable ψ being taken as outputs. Here, the regression model as the learned model may be a linear regression model. Further, the regression model may be a neural network. The learning of the regression model can be achieved with the use of, as training data, the steering angle θh and the pinion angle θp, and values of the first bending angle α1, the second bending angle α2, and the difference angle variable ψ measured in response to the steering angle θh and the pinion angle θp.

In a case of the configuration where the intermediate shaft 18 does not have the phase difference ε, or in a case where the tolerance of the phase difference ε can be ignored, the angle ξ formed herein may be a difference angle variable as an estimated target.

In a case of the configuration where the intermediate shaft 18 does not have the phase difference ε, or in a case where the tolerance of the phase difference ε can be ignored, and in a case where the axial direction of the column shaft 14, the axial direction of the intermediate shaft 18, and the axial direction of the pinion shaft 22 are parallel to one plane, the difference angle variable ψ may not be estimated.

Reflection Process

The reflection process is not limited to a process including the compensating torque calculation process M20. For example, in the assist torque calculation process M22, a process of calculating the assist torque Ta with the use of the steering torque Th, the steering angle θh, and the tilt angle θtl as inputs may be implemented. In that case, the reflection process can be configured by the assist torque calculation process M22.

The reflection process is not limited to a process of compensating the gravitational component in the steering torque Th. For example, in a case where the torque sensor 72 is a sensor configured to detect a torque applied to the pinion shaft 22, the reflection process may be a process of converting a detection value from the sensor into the steering torque Th as a torque applied to the column shaft 14. This is made in consideration that dependence of the ratio between the steering torque Th and the torque applied to the pinion shaft 22 on the steering angle θh changes in accordance with the first bending angle α1 and the second bending angle α2.

Further, for example, in a case where a controller configured to determine the assist torque Ta in accordance with the steering angle θh is provided, a process of estimating the steering angle based on the pinion angle θp may be included in the reflection process.

Steering Computing Device

The control device 50 is not limited to a device including the PU 52 and the storage device 54 and configured to execute a software process. For example, the control device 50 may include an exclusive hardware circuit (e.g., an ASIC, and the like) configured such that at least part of the processes performed by software processing in the above embodiment is performed by hardware processing. That is, the steering computing device may have any of the following configurations (a) to (c).

(a) The steering computing device includes a processing device configured to execute all of the above processes in accordance with a program, and a program storage device such as a ROM in which the program is stored.

(b) The steering computing device includes a processing device configured to execute part of the above processes in accordance with a program, a program storage device, and an exclusive hardware circuit configured to execute the rest of the processes.

(c) The steering computing device includes an exclusive hardware circuit configured to execute all of the above processes.

Here, a plurality of software processing circuits including a processing device and a program storage device, or a plurality of exclusive hardware circuits may be provided. That is, the processes may be executed by a processing circuit including at least either of one or more software processing circuits and one or more exclusive hardware circuits.

Steering Apparatus

The steering apparatus is not limited to the configuration in which the rotating shaft of the assist motor 42 and the rack shaft 30 are placed in parallel to each other. For example, the steering apparatus may include a second rack-and-pinion mechanism separately from the rack-and-pinion mechanism 32 so as to give the torque of the assist motor 42 via the second rack-and-pinion mechanism.

OTHERS

A factor that the bending angles α1, α2 change is not limited to the change in the tilt angle. For example, the use of a telescopic function may be the factor that the bending angles α1, α2 change.

What is claimed is:

1. A steering computing device for calculating state quantity of a steering apparatus, the steering apparatus including a steering wheel, an input shaft, an intermediate shaft, an output shaft, a first Cardan joint, a second Cardan joint, and steered wheels, the input shaft being connected to the steering wheel, the first Cardan joint being a member connecting the input shaft to the intermediate shaft, the second Cardan joint being a member connecting the intermediate shaft to the output shaft, the steered wheels being configured to receive a steering torque input into the steering wheel, via the input shaft, the intermediate shaft, and the output shaft, the steering computing device comprising a processor configured to execute a steering angle variable acquisition process, an output shaft angle variable acquisition process, and a joint angle variable calculation process, wherein:

the steering angle variable acquisition process is a process of acquiring a value of a steering angle variable as a variable indicative of a rotation angle of the steering wheel;

the output shaft angle variable acquisition process is a process of acquiring a value of an output shaft angle variable as a variable indicative of a rotation angle of the output shaft;

the joint angle variable calculation process is a process of calculating a value of a joint angle variable with use of the value of the steering angle variable and the value of the output shaft angle variable as inputs; and the joint angle variable is a variable defining an angle formed between an axial direction of the input shaft and an axial direction of the output shaft.

2. The steering computing device according to claim 1, wherein the joint angle variable includes a first bending angle defining an angle formed between the input shaft and the intermediate shaft, and a second bending angle defining an angle formed between the output shaft and the intermediate shaft.

3. The steering computing device according to claim 2, wherein:

the joint angle variable further includes a difference angle variable in addition to the first bending angle and the second bending angle;

the difference angle variable is a variable depending on an angle formed between a first plane and a second plane;

the first plane is a plane parallel to the axial direction of the input shaft and an axial direction of the intermediate shaft; and the second plane is a plane parallel to the axial direction of the output shaft and the axial direction of the intermediate shaft.

4. The steering computing device according to claim 1, wherein:

the steering angle variable acquisition process includes a process of acquiring different values for the steering angle variable;

the output shaft angle variable acquisition process includes a process of acquiring values for the output shaft angle variable, the values being synchronized with the different values for the steering angle variable, respectively; and the joint angle variable calculation process is a process of calculating the value of the joint angle variable with use of, as inputs, the different values for the steering angle variable and the values for the output shaft angle variable, the values being synchronized with the different values, respectively.

5. The steering computing device according to claim 4, wherein the different values targeted to be acquired in the steering angle variable acquisition process include values having absolute values for the steering angle variable such that a difference between a minimum value among the absolute values and a maximum value among the absolute values is equal to or more than a predetermined value.

6. The steering computing device according to claim 4, further comprising a storage device in which relationship definition data is stored, wherein:
   the relationship definition data is data defining a relational expression;
   the relational expression is an expression defining a relationship between the value of the steering angle variable, the value of the output shaft angle variable, and the value of the joint angle variable; and
   the joint angle variable calculation process includes a process of calculating the value of the joint angle variable by a method of least squares by inputting, into the relational expression, the different values for the steering angle variable and the values for the output shaft angle variable, the values being synchronized with the different values, respectively.

7. The steering computing device according to claim 1, wherein:
   the steering apparatus includes an actuator configured to generate power turning the steered wheels;
   the steering computing device is configured to execute an operation process and a reflection process;
   the operation process is a process of operating the actuator in response to operation of the steering wheel; and
   the reflection process is a process of reflecting the value of the joint angle variable on the operation of the actuator.

* * * * *